May 6, 1924.
J. C. ANDERSON
MANURE SPREADER
Filed Dec. 23, 1922 2 Sheets-Sheet 1
1,492,622
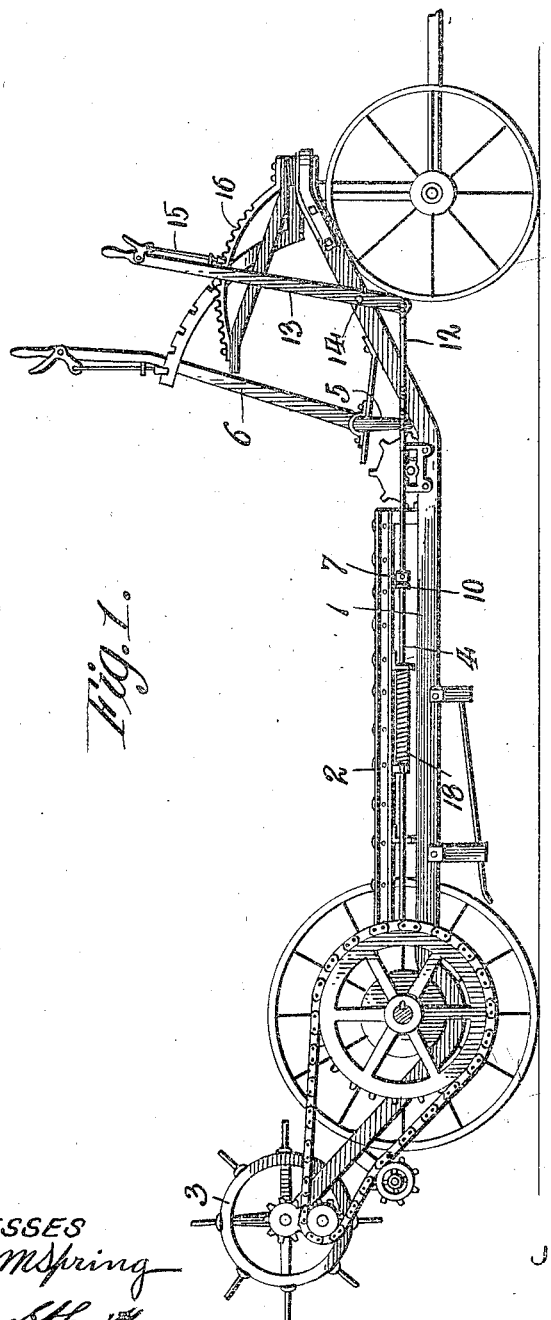
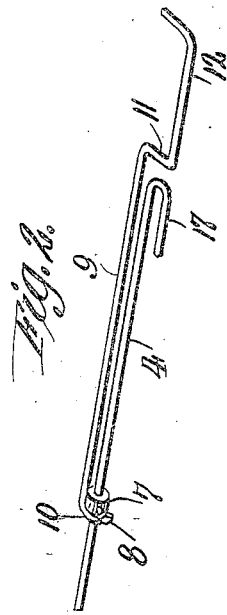
WITNESSES
JOHN C. ANDERSON Inventor
By Richard B. Owen Attorney

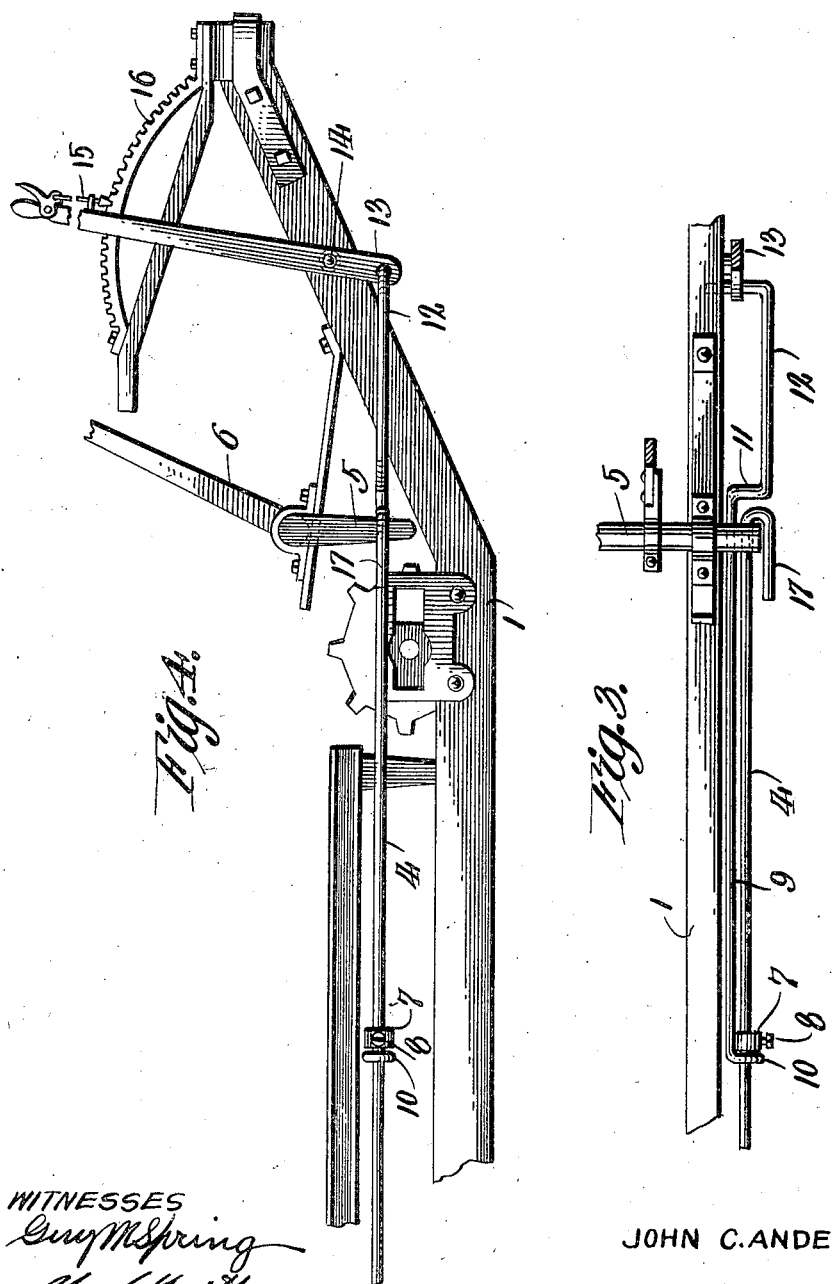

Patented May 6, 1924.

1,492,622

UNITED STATES PATENT OFFICE.

JOHN C. ANDERSON, OF STORDEN, MINNESOTA.

MANURE SPREADER.

Application filed December 23, 1922. Serial No. 608,679.

*To all whom it may concern:*

Be it known that I, JOHN C. ANDERSON, a citizen of the United States, residing at Storden, in the county of Cottonwood and State of Minnesota, have invented certain new and useful Improvements in a Manure Spreader, of which the following is a specification.

The present invention relates to manure spreaders and has for its principal object to provide means whereby the conveyor of the spreader may be operated independently of the scattering device thereof.

A still further object of the invention is to provide a device of this nature which will be simple and efficient in construction, reliable in operation, and well adapted to the purpose for which it is designed.

With the foregoing and numerous other objects in view which will appear as the description proceeds, the invention resides in the combination and arrangement of parts and in the details of construction hereinafter described and claimed, it being understood that changes in the precise embodiment of the invention herein described can be made within the scope of what is claimed without departing from the spirit of the invention.

In the drawing

Figure 1 is a side elevation of a manure spreader showing my invention thereon,

Figure 2 is a detail perspective of a portion of the conveyor control rod and my auxiliary rod associated therewith, Figure 3 is an enlarged top plan detail of this mechanism showing the same associated with portions of the spreader, and Figure 4 is a side elevation of the detail disclosed in Figure 3.

Referring to the drawing in detail it will be seen that the manure spreader 1 is of conventional construction and includes the conveyor portion 2 and the scattering device 3 mounted to the rear of the spreader. The conveyor mechanism 2 is controlled by a rod 4 extending longitudinally of the frame of the spreader 1 and the scattering device 3 is controlled by a similar rod (not shown) on the other side of the frame of the spreader. Both of these control rods 4 are actuated by the crank shaft 5 which in turn is controlled by the lever 6.

It is often desirable to operate the conveyor independently of the scattering device 3 and in the type of manure spreader illustrated no such provision is made. In order to accomplish this end I dispose a collar 7 on the operating rod 4 this collar being held in place by a set screw 8. An auxiliary control rod 9 is provided at one end with an offset eye 10 through which the rod 4 extends. The other end of the rod 9 is offset as at 11 and terminates in the parallel extension 12 the end of which is bent so as to be engaged by a lever 13 fulcrumed at 14 on the frame of the spreader 1. This lever is provided with the usual dog 15 for engagement with the notches on a quadrant 16. It is to be noted that in this form of manure spreader the cranks of the crank shaft 5 extend in the hooked portions 17 of the rods 4 so that when the upper end of the lever 6 is fulcrumed rearwardly the rods 4 will be pulled thus placing the conveyor mechanism and the scattering device in operation. The spring 18 is tensioned and engaged with the rod 4 so as to return it to a normal position as the lever 6 is fulcrumed in the reversed direction thereby placing the conveyor mechanism out of operation. The rod 4 on the other side of the spreader, not shown, operates in a similar manner in conjunction with the scattering device 3. As stated above it is often desirable to operate the conveyor mechanism independently of the spreader device in order to dump the manure on the ground without scattering the same and this is accomplished by actuation of the lever 13 so as to pull the auxiliary control rod 9. When this rod 9 is pulled forwardly of the spreader the eye 10 engages the collar 7 and likewise pulls the rod 4 so that the conveyor mechanism will be operated without placing the scattering device in operation.

Having thus described my invention what I claim as new is:—

A combination, a control rod terminating in a hooked portion, a crankshaft having one crank thereof disposed in said hooked portion, a lever for actuating the crankshaft, an auxiliary control rod having an eye at one end through which the first mentioned control rod passes, a collar on the first mentioned control rod for engagement with said eye, and a lever for actuation of the auxiliary control rod.

In testimony whereof I affix my signature in presence of two witnesses.

JOHN C. ANDERSON.

Witnesses:
   SEPHUS ANDERSON,
   ELMER KLARUP.